United States Patent [19]

Imai et al.

[11] 3,912,834

[45] Oct. 14, 1975

[54] PROCESS FOR PRODUCING A SELECTIVELY PERMEABLE COMPOSITE

[75] Inventors: Satoshi Imai; Tamiyuki Eguchi; Masaaki Shimokawa, all of Kobe, Japan

[73] Assignee: Kanegafuchi Kagaku Kogyo Kabushiki Kaisha, Osaka, Japan

[22] Filed: May 18, 1973

[21] Appl. No.: 361,557

[30] Foreign Application Priority Data
June 5, 1972    Japan.................................. 47-56266
Jan. 20, 1973   Japan................................... 48-9085

[52] U.S. Cl. ................. 427/316; 210/490; 210/500; 427/322; 427/324; 427/336; 427/430; 427/439; 428/260; 428/262; 428/264; 428/290

[51] Int. Cl.²............... B01D 13/06; D06M 15/32; D06M 13/54

[58] Field of Search .......... 117/68, 47 R, 138.8 UH, 117/138.8 E, 138.8 N, 138.8 PV, 138.8 F, 143, 76 F, 161 VN, 161 UH, 166; 210/490, 500

[56] References Cited
UNITED STATES PATENTS

| 1,720,670 | 7/1929 | Duclaux................................ 210/500 |
| 3,342,729 | 9/1967 | Strand................................. 210/500 |
| 3,429,957 | 2/1969 | Merten ................................ 264/49 |
| 3,494,470 | 2/1970 | Banfield.............................. 210/321 |
| 3,544,358 | 12/1970 | Manjikian ............................ 117/63 |
| 3,549,016 | 12/1970 | Rigopulos ........................... 210/500 |
| 3,556,305 | 1/1971 | Shorr................................... 210/490 |
| 3,648,845 | 3/1972 | Riley.................................... 210/490 |
| 3,762,566 | 10/1973 | Del Pico ............................. 210/490 |

*Primary Examiner*—P. E. Willis, Jr.
*Attorney, Agent, or Firm*—James C. Haight

[57] ABSTRACT

A selectively permeable composite membrane is produced by providing a solution of a film-forming polymer, impregnating a liquid in which the film-forming polymer is insoluble to a porous backing material to the extent that at least one of surfaces of the backing material remains substantially free from the liquid while other portions thereof become wet, applying the solution of film-forming polymer to the surface of backing material to form a layer thereof, and gelling said layer of solution to form a membrane thereof.

20 Claims, 3 Drawing Figures

PROCESS FOR PRODUCING A SELECTIVELY PERMEABLE COMPOSITE

This invention relates to a process for producing a selectively permeable composite membrane, more particularly it relates to a process for producing a microporous film onto a backing material to give a selectively permeable membrane which is suitable for use in ultrafiltration or reverse-osmosis.

It has been a well-known fact that a membrane for use in membrane-separation process such as ultrafiltration or reverse-osmosis must have sufficient mechanical strength and durability as well as selective permeability. As is well-known in the art, since the degree of the selective permeability will not depend upon the thickness of the membrane, membranes are more preferable to secure a higher flux rate thereof.

Many types of selectively permeable membranes and processes for producing the same have been already known. Among them, those of the asymmetric membrane type are superior to others. The membranes of said type have an asymmetric structure comprising an upper compact layer to be in contact with the filtering liquid and a lower layer, adjacent thereto, comprising a microporous structure. The selective permeability and the flux rate thereof depend upon the nature of the upper compact layer, referred to as the "active layer".

Said asymmetric membranes are generally produced by the steps of spreading a solution of film-forming polymers in a suitable solvent therefor, removing the solvent in part from the solution and gelling the residual polymer. For example, Japanese Pat. publication No. 14891 of 1970 discloses a process for producing asymmetric cellulose acetate membranes for use in salt rejection in which a cellulose acetate dope in acetone is spread by pouring to make a thin, continuous layer thereof, acetone is evaporated in part and then the layer is immersed in cold water to complete the gelation thereof. The membranes thus obtained must be used in the membrane separation process together with a suitable support therefor, since the mechanical strength thereof is too small to use them alone for such purposes.

In U.S. Pat. No. 3,549,016, a process for producing a composite membrane incorporated with a reinforcing material is disclosed. According to this process, a nonwoven fabric made of polyester fibers is placed and adhered on a plate having a smooth surface such as a glass plate, a solution of a film-forming polymer is poured and spread thereon, a part of solvent is evaporated, and the resulting layer is gelled to give a membrane having the asymmetric structure. However, this process has a disadvantage that the polymer solution applied tends to penetrate into the interior or the opposite surface of the fabric, which forms, after evaporation and gelling, a compact layer as the active layer throughout the fabric away from the desired asymmetric structure, so that the flux rate through the membrane has been remarkably decreased, while the selective permeability has been substantially unaffected.

It will be easily understood that the above-mentioned process is not suitable for the production of a large size membrane or for a continuous operation.

It is an object of this invention to provide a process for the production of a selectively permeable composite membrane of the asymmetric structure having a sufficient mechanical strength, selective permeability and flux rate which can overcome the above-mentioned disadvantages of the known processes. Another object of this invention is to provide a process which is especially adapted for the production of a large size membrane in a continuous operation. Other objects will be apparent to those skilled in the art to which this invention pertains.

According to this invention, porous backing materials such as cloths, nonwoven fabrics, papers and the like are impregnated, prior to coating of a film-forming polymer solution thereto, with a liquid in which said polymer is insoluble to the extent that at least one of the surfaces of the backing material has remained substantially free from the liquid while other portions, especially the interior thereof become wet. The coating solution of the film-forming polymer in a volatile solvent is then applied to the said surface of the backing material and the coating layer is then gelled or otherwise treated to give a selectively permeable membrane on the backing material.

As the backing material, cloths, nonwoven fabrics, filtering papers or porous tubes such as sintered metallic tubes may be used. They may be made of natural or synthetic fibers or yarns such as polyolefins, polyamides, polyesters, polyvinyl chlorides, polyvinylidene chlorides, cellulosic polymers, or polyacrylate polymers. Commercially available filter cloths made of synthetic fibers are preferable as the backing material.

The film-forming polymers to be used for carring out of this invention are those known in the art and include a wide variety of polymeric film-forming substances. For example, polyvinyl chloride, vinyl chloride — acrylonitrile copolymer, polysulfone, cellulose nitrate and the like are suitable for the production of membranes for use in ultrifiltration or those having continuous, semi-permeable micro-holes. Cellulose acetate, polyelectrolytes, aromatic polyamide and the like are suitable for the production of membranes for use in salt rejection. The solvents for dissolving said film-forming polymers are also well-known in the art. Any one of such solvents may be used unless it also dissolves the backing material. Preferably they are miscible with the gelling agent such as water or alcohols, if the coating layers are to be gelled by the wet process. Examples of such solvents are ketones such as acetone or cyclohexanone, formamide, dimethylformamide, tetrahydrofuran, cyclohexane, dimethylsulfoxide, and the mixtures thereof.

The liquid to be impregnated into the backing material may not dissolve the backing material as well as the film-forming polymer to be applied. The liquid will prevent the film-forming polymer from penetrating into the interior of the backing material. Preferably, the liquid is volatile and miscible with a gelling agent such as water or alcohols, if the wet process is to be carried out in the subsequent gelling step. Furthermore, the liquid may be the same as the gelling agent. Water, or alcohols such as methanol, ethanol, propanol and the mixtures thereof are preferable examples of said liquid, since they are cheap and easily available.

In the following table, illustrative examples of combinations of such backing materials, film-forming polymers and solvents thereof, impregnating liquids, and gelling agents are given.

Table 1

| Backing Material | Film-forming Polymer | Solvent | Impregnating Liquid | Gelling Agent |
| --- | --- | --- | --- | --- |
| polyamide | cellulose acetate | acetone-formamide mixture | water | water |
| polyolefin | " | " | " | " |
| polyolefin [1] | polysulfone | dimethylformamide | water | water |
| " | " | " | methanol | water |
| polyolefin [2] | polyvinyl chloride | dimethylformamide | water | water |
| " | " | " | water | methanol |
| " | " | " | methanol | water |
| " | " | " | methanol | methanol |
| " | " | dimethylformamide-tetrahydrofuran mixture | water | water |
| " | 41 | " | water | methanol |
| " | " | " | methanol | water |
| " | " | " | methanol | methanol |
| " | " | cyclohaxanone | water | methanol |
| " | " | " | methanol | methanol |
| polyvinyl [3] chloride | SBR | cyclohexane | water | none |
| " | " | " | methanol | none |

Note [1] and [2]: Polyamide may be used instead of polyolefin.
Note [3]: Polyvinyl chloride refers to that which resulted from the steps as shown by the Note 2. However, the SBR coating layer is not subjected to gelling step but is dried at room temperature. For details, see Example 5.

In a preferred embodiment of this invention, backing materials are immersed in said impregnating liquid, squeezed to remove excess liquid, and dried with hot air to the extent that at least one of surfaces of said backing material becomes substantially free from said liquid while other portions thereof remain wet. The drying may be carried out at a temperature of 20°C. to 80°C, preferably at about 50°C in case of methanol, or at 50°C to 100°C, preferably at about 80°C in the case of impregnating with water.

Alternatively the liquid may be rubbed away from the surface of the backing material with a clean, dried cloth. During this step, the use of such higher temperatures that will cause deterioration of the backing material should be avoided. For example, a backing material made of polyvinyl chloride should be treated below about 60°C. If a specific kind of the impregnating liquid is chosen to a specific backing material and the conditions of air-drying except for the necessary time are set, the rate of evaporation of said liquid will vary as the function of the drying time. The shorter the drying time, the poorer the adhesion of the coating layer to the backing material, while a longer period of time for drying permits undesirable penetration of the polymer solution into the interior of the backing material. Generally speaking, penetration of the solution of said film-forming polymer extending in a very shallow depth into the backing material is sufficient to obtain a good adhesion. For example, the penetration extending to a depth of from 0.08 to 0.1 mm is sufficient for a textile fabric of 0.5 mm thickness to prevent peeling the film layer from the fabric. The same degree of good adhesion may be secured with less penetration when nonwoven fabric or felt is chosen as the backing material. The necessary length of time for drying may also vary with the quality and the grain structure of the backing material used. For example, woven fabric permits much deeper penetration of the polymer solution than a corresponding nonwoven fabric of the same quality under the same length of drying time. These conditons may be easily determined experimentally while making reference to the hereinafter described examples.

After the backing material has been treated with the impregnating liquid in the manner as stated above, the solution of film-forming polymer is applied onto only the surface of the backing material which is substantially free from the impregnating liquid. The coating of said solution may be carried out in any known manner, but spreading or dipping is especially preferred. After dipping the backing material in the coating solution, the coated material may be rolled while the coating solution retains the solvent to spread the solution uniformly. However this step is usually unnecessary to obtain a uniform coating when dipping method is employed. During the operation of dipping, preferably throughout the process of this invention including said dipping step, the backing material may be treated in the form of a pile of two layers which were sealed together at their peripheral edges. After completion of the process, they may be separated from each other as the finished product. When the viscosity of the coating solution is too high, it is difficult to carry out the coating by the dipping method, because it often results in the formation of pinholes and excessive deposition of the solution. In such cases, the solution may preferably be poured and spread to give a uniform coating. Contrarily, if the viscosity of the coating solution is relatively low, the dipping method is preferable. For example, the solutions shown in the aforementioned table may be preferably applied either by the dipping method in case of less than 15% by weight concentrations, or by the spreading method in other cases regardless of the kind of the film-forming polymer.

The gelation of the coating layer may be carried out either by the wet process or the dry process in a conventional manner known to those skilled in the art. However, the wet process using a liquid which is miscible with the impregnating liquid as the gelling agent is most preferable. This may be accomplished by immersing the coated material in the gelling agent for a sufficient period of time to cause gellation.

As an additional step which is optional for the present invention, an ultra-thin film layer may be coated on the selectively permeable membrane thus obtained. For example, a solution containing several percent by weight of styrene-butadiene copolymer (SBR) is applied by the dipping method. After drying, the ultra-thin film layer thus formed may be sulfonated, or aminated in a known manner to obtain a membrane having ionizable radicals such as sulfonic, amino, or both.

In another embodiment of this invention, the impregnating liquid is applied from the back of the backing material. A solution of the film-forming polymer is applied on the other surface and the coated layer is allowed to gel either by the wet process or by the dry process in the same manner as hereinbefore described.

According to this embodiment, the viscosity of the coating solution and the selection of the backing material is not very critical, since the coating solution will not penetrate so deeply into the interior of the backing material when the solution is applied by the spreading method as when applied by dipping.

In the accompanying drawings, there is shown an apparatus which is adapted for the practice of the above-mentioned embodiment of this invention.

The figures of this drawing are related as follows.

Figure 1:
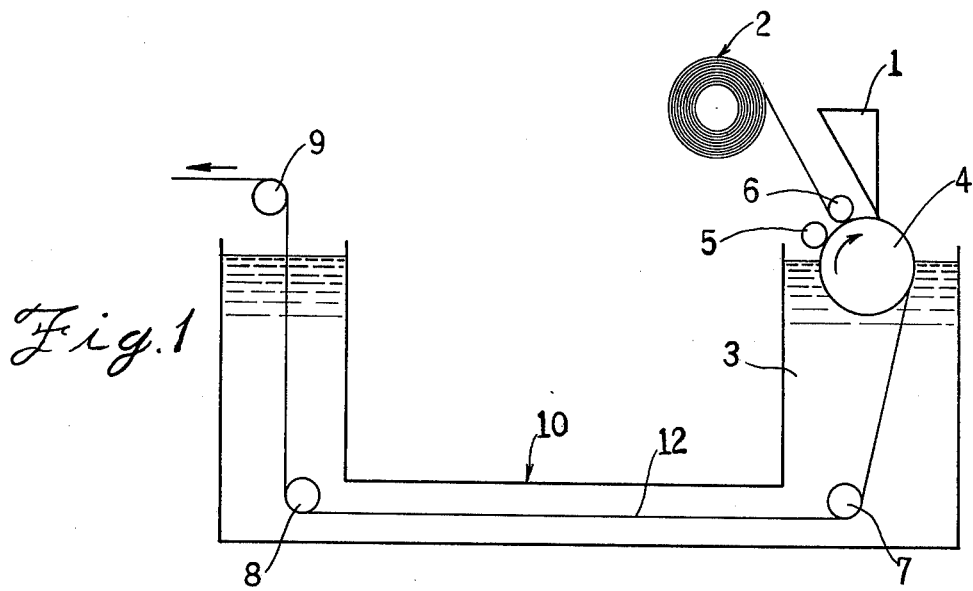
FIG. 1 is a sectional view of the apparatus which is adapted for the wet process.
Figure 2:
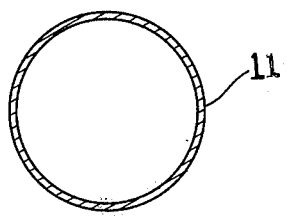
FIG. 2 is an enlarged sectional view of the rotating drum of the apparatus of FIG. 1.

As referred to in FIG. 1, backing material having an appropriate width and a sufficient length is stored in the form of a roll. The backing material 2 passes between a rotating drum 4 and a pressing roll 6. The outer surface of the drum 4 is surrounded with an absorbent layer such as felt cloth or nonwoven fabric 11 as shown in FIG. 2 and the drum 4 is partly immersed in impregnating liquid 3. As the backing material 2 proceeds, the impregnating liquid 3 is applied to the back of the material 2. A roll 5 is facing against the drum 4 to remove excessive amounts of the liquid 3 by squeezing. A solution of a film-forming polymer is stored and spread on the front surface of the backing material 2 by a coater 1 which is provided with a means for adjusting the flow rate of the coating solution. Then the coated material enters into a bath 10 filled with the liquid 3 and the coated layer is gelled. In the apparatus as shown in FIG. 1, it will be easily understood that the impregnating liquid 3 also plays a roll of the gelling agent. Between the coater 1 and the bath 10, there may be provided, if necessary, a means for controlling the evaporation of the solvent from the polymer solution. The coated material 12 further proceeds in the gelling bath 10 along guide rolls 7 and 8 until the gelation has been completed. After the gelation step, the membrane thus formed may be subjected, if necessary, to a subsequent treatment. Finally the finished composite membrane is wound in a roll.

Figure 3:
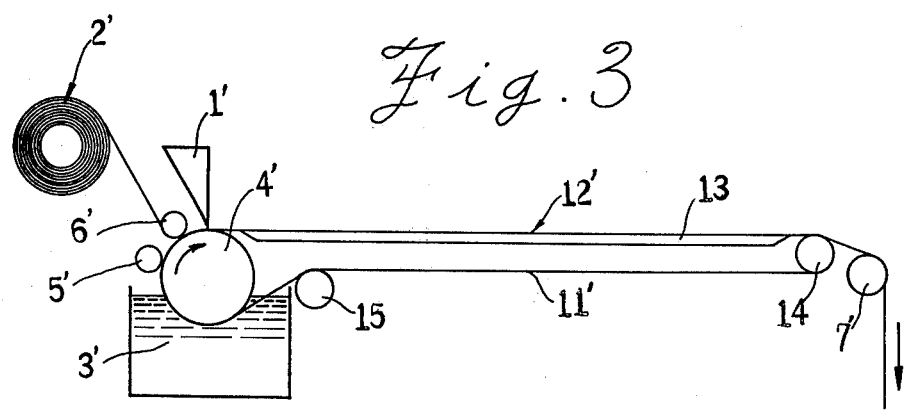
FIG. 3 is a sectional view of another type of the apparatus which is adapted for the dry process.

In FIG. 3, there is shown another type of apparatus in which the film forming step is carried out by the dry process. The same numerals are used with a prime (') to represent the corresponding parts as in FIG. 1. In the same manner as hereinbefore described, the backing material 2' is contacted with the impregnating liquid 3' from the back and the coating solution is applied on the front surface by the coater 1'. The coated material 12' proceeds on the supporting plate 13 and reaches roll 7'. During this period, the solvent of the coating solution is evaporated and a membrane is formed on the backing material. The composite membrane thus formed may be subjected, if necessary, to a subsequent treatment and is wound into a roll. If the impregnating liquid is lost from the backing material by evaporation during the drying step, it will permit the coating solution to penetrate into the interior of the backing material. To prevent this, an endless supplier 11' of the impregnating liquid 3' is extended to roll 14 and is circulated as the coated material 12' proceeds along the rotating drum 4' and rolls 14 and 15. The supplier 11' keeps in contact with the backing material 12' throughout the drying step and prevents evaporation of the impregnating liquid so that excessive penetration of the solution of film-forming polymer may be avoided.

The advantages of this invention, among others, may be summarized as follows:

1. A selectively permeable membrane can be formed only on the surface portion of a porous material.
2. A wide variety of combinations of film-forming polymer and backing material is possible, while the process itself is very simple.
3. The membrane is reinforced without affecting the permeability and the flux rate thereof.
4. The composite membrane obtained has pathways not only in the vertical but also in the parallel directions to the surface thereof.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

A coating solution was prepared by dissolving 15g of cellulose acetate (L-AC sold by Daicel Ltd., Osaka, Japan; acetyl number 55 ± 0.5) in a mixture of 80g of formamide and 55g of acetone and centrifuging the solution. As the backing material, commercial nylon filter cloth (FN-9A, sold by Fuji Senishizai Kogyo K.K., Japan) was used. Two pieces of the cloth 8cm × 8cm were piled and sealed with epoxy resin at the peripheral edges and washed with 1N HCl, water, acetone and water successively. Then the cloth was dried at 85°C for 8 minutes. The resulting pile of cloths retained water between the cloths, while outer surfaces were substantially free from water. The cloth was dipped into the coating solution at room temperature (20°C) for several seconds, drawn up at a rate of about 1 cm per second, and then allowed to stand for 90 seconds at room temperature. The cloth was immersed in water at 15°C for 1 hour to cause gelation of the coating solution and treated with hot water at 80°C - 82°C for 5 minutes. From the resulting pile, two test pieces each having a diameter of 52mm were cut out.

By microscopic observation of the cross-section of the membrane, it was found that the coating solution did not reach the back of the cloth and no membrane is present on the back. The membrane thus formed has a sufficient resistance against peeling. The flux rate of water was measured using this test piece and the result obtained was 20.9 gallons/ft.$^2$/day under a pressure of 50 kg/cm$^2$. On the same test, the flux rate with 3.5% aqueous solution of sodium chloride was 7.30 gallons/ft.$^2$/day and the salt rejection was 73%. The salt rejection was calculated by the following equation.

Salt rejection = $(C - C')/C \times 100$
C = Concentration of the original solution
C' = Concentration of the filtrate In the preceding process, the filter cloth was thoroughly dried after washing and was treated in the same manner. The membrane thus obtained was unsatisfactory because the coating solution had penetrated to the back of the cloth and formed a film there.

EXAMPLE 2

A commercial polypropylene filter cloth (FP-9A, sold by Fuji Senishizai Kogyo K.K., Japan) was treated by the same manner as in Example 1. A good adhesion resulted between the cloth and the polymer layer, and the coating solution had not reached the back. On the filtering test, approximately the same result was obtained as in Example 1.

EXAMPLE 3

The procedure of Example 1 was repeated, except the cloth was allowed to stand at room temperature (about 20°C) for 60 seconds. A good adhesion resulted between the cloth and the polymer layer and the coating solution had not reached the back. With the same size of test piece, the same filtering test was carried out. The flux rate of water was 43.5 gallons/ft.$^2$/day and the same with 3.5% aqueous solution of sodium chloride was 18.7 gallons/ft.$^2$/day. The salt rejection was 40%. The flux rate of 10% aqueous solution of sucrose was 15.2 gallons/ft.$^2$/day and the rejection of sucrose was 87%.

EXAMPLE 4

A coating solution was prepared by dissolving 13.5g of pure polyvinyl chloride (S1001, sold by Kanegafuchi Kagaku Kogyo K.K., Osaka, Japan, polymerization degree 1,000) in a 1:7 mixture of tetrahydrofuran and dimethylformamide. A commercial polypropylene filter cloth (FP-9A) was treated by the same manner as in Example 1 and was dipped into the coating solution at room temperature (20°C) for several seconds, drawn up at a rate of about 1cm per second, and then allowed to stand for 1 minute at room temperature. The cloth was immersed in methanol at room temperature for 30 minutes to cause gelation of the coating solution and then dried at 51°C for 20 minutes. By microscopic observation of the cross-section of the membrane, it was found that the coating solution had not reached the back of the cloth. The membrane thus formed has a sufficient resistance against peeling. On the filtering test, the flux rate of water was 513 gallons/ft.$^2$/day under a pressure of 50 kg/cm$^2$. On the same filtering test using a 40% solution of styrene-butadiene rubber (Solprene No. 303, sold by Japan Synthetic Rubber Co., Ltd., Tokyo, Japan, styrene content 48%) in cyclohexane as the filtering liquid, the flux rate was 6.12 gallons/ft.$^2$/day under a pressure of 10 kg/cm$^2$ and the rejection of SBR was more than 90%.

EXAMPLE 5

The procedure of Example 4 was repeated, except the membrane was dried at 42°C for 20 minutes after the gelation step. The resulting cloth was dipped into a 2.5% solution of SBR (Solprene No. 303) in cyclohexane, drawn up at a rate of about 1 cm per second, and dried at room temperature (23.5 °C) for 30 minutes. A test piece having a diameter of 52mm was taken from the resulting cloth and was immersed in 97% sulfuric acid for 30 minutes for sulfonation and cross-linking. Then the piece was washed with 60% sulfuric acid for 5 minutes and then with water for 1 hour. The resulting sulfonated membrane was treated with 1N sodium chloride aqueous solution at 50°C for 2 hours to convert it into the Na$^+$ type. On the filtering test, the flux rate of 3.5% sodium chloride solution was 8.29 gallons/ft.$^2$/day under a pressure of 30 kg/cm$^2$ and the salt rejection was 34%. The ultra-thin film of SBR was not stripped off during the operation.

EXAMPLE 6

A composite membrane was produced using the apparatus of FIG. 1. A commercial polypropylene filter cloth (FP-116, sold by Fuji Senishizai Kogyo K.K., Japan, 50cm width, 0.25mm thickness) was used as the backing material. 20 parts by weight of cellulose acetate (L-AC) was dissolved in a mixture of 26.7 parts by weight of dimethylformamide and 53.3 parts by weight of acetone and the solution was filtered through a 5$\mu$ filter. The resulting solution was used as the coating solution. Excess impregnating liquid 3 (water, about 4°C) was removed from the rotating drum 4 by applying a pressure of about 5kg to the roll 5. The filter cloth was pressed by the roll 6 weighing about 1kg on the rotating drum 4 and was contacted with the liquid 3 from the back. At a supplying speed of about 10 cm/minute, the cloth was coated with the above-mentioned solution in width of 45 cm and proceeded for about 50 seconds thereafter. During this period, the solvent in the coating solution was allowed to evaporate. The cloth was then immersed in the gelation bath 10 filled with water at 4°C for 1 hour to complete the gelation and was treated with water at 80°C for minutes. After completion of the foregoing steps, the finished membrane was wound in a roll. Six pieces each having a diameter 52mm were taken at random from the finished membrane. On the filtering test using a 3.5% salt solution, the average flux rate was 13.1 gallons/ft.$^2$/day under a pressure of 100 kg/cm$^2$ and the average salt rejection was 96.3%. By the microscopic observation of the cross-section of the membrane, it was found that a film was formed on only one of surfaces the of the cloth.

EXAMPLE 7

The procedure of Example 6 was repeated, except a commercial nylon filter cloth of 0.5mm thickness (681, Fuji Senishizai Kogyo K.K.) was used and a pressure of about 8kg was applied to the rotating drum 4 by the roll 5 to remove excessive amounts of water. On the same filtering test as in Example 6, the average flux rate was 20.2 gallons/ft.$^2$/day and the average salt rejection was 70.0%. Observation of the section of the resulting product by a microscope showed the same result as in Example 6.

EXAMPLE 8

A composite membrane was produced using the apparatus of FIG. 3. A commercial polypropylene filter cloth (FP-116, 50cm width, 0.25mm thickness) was used as the backing material. A solution of 14 parts by weight of pure polyvinyl chloride (S1001, Kanegafuchi Kagaku Kogyo K.K.) dissolved in a mixture of 12.3 parts by weight of tetrahydrofuran and 73.7 parts by weight of dimethylformamide was used as the coating solution. Excess of the impregnating liquid (water, room temperature) was removed from the drum 4' by applying a pressure of about 5kg to the roll 5'. The filter cloth was pressed by the roll 6' weighing about 1kg on the drum 4' and was contacted with the liquid 3' from the back. The cloth was supplied at a speed of about 10 cm/minute. The cloth was then coated with the coating solution in width of 45 cm and was dried to remove the solvent for 30 minutes. The finished product was wound into a roll in methanol. By the microscopic observation of the cross-section of the membrane, it was found that a film was formed on only one of the surfaces of the cloth. As in Example 6, six pieces each having a diameter of 52 mm were taken and were tested. The results obtained are tabulated in the following table.

Table 2

| Pressure (kg/cm$^2$). | Original liquid | Flux rate (f.g.d.) | Rejection (%) |
|---|---|---|---|
| 5 | 2500 ppm pepsin in water | 13.2 | 97.2 * |
| 4 | Washing of ground mackerel meat (COD 12400 ppm) | >4 | 88 |
| 4 | Washing of dissected mackerel (COD 8160 ppm) | >5 | 80 |
| 5 | Distilled water | 72.7 | — |

Note:
*Analyzed by U.V. spectrography.
COD was measured according to JIS-K-0102.

From the foregoing description, one skilled in the art can easily ascertain the essential characteristics of this invention, and without departing from the spirit and scope thereof, can make various changes and modifications of the invention to adapt it to various usages and conditions.

We claim:

1. In a process for preparing a selectively permeable, asymmetric, composite membrane by impregnating a porous, textile fabric backing material with a nonsolvent for a film-forming polymer, applying a solution of said film-forming polymer in a solvent which is inert to said backing material onto said backing material and gelling the film-forming polymer to form said membrane, the improvement which comprises:

applying a solution of said film-forming polymer onto a surface of said backing material which is substantially free of said nonsolvent while the remainder of said backing material is impregnated with said nonsolvent.

2. A process according to claim 1, wherein said backing material is a filter cloth.

3. A process according to claim 2 wherein said filter cloth is a polymeric material selected from the group consisting of polyolefins, polyamides, polyesters, polyvinyl chlorides, polyvinylidene chlorides, cellulosic polymers and polyacrylates.

4. A process according to claim 3 wherein said filter cloth is a polyethylene filter cloth.

5. A process according to claim 3 wherein said filter cloth is a polypropylene filter cloth.

6. A process according to claim 3 wherein said filter cloth has a thickness of about 0.25 to 0.5 mm.

7. A process according to claim 1 wherein said film-forming polymer is selected from the group consisting of polyvinyl chloride, copolymers of vinyl chloride with acrylonitrile, polysulfone and cellulose nitrate.

8. A process according to claim 7 wherein said film-forming polymer is polyvinyl chloride.

9. A process according to claim 8 wherein the polyvinyl chloride is dissolved in a solvent selected from the group consisting of dimethylformamide, tetrahydrofuran, cyclohexanone and mixtures thereof.

10. A process according to claim 8 wherein said nonsolvent is selected from the group consisting of water, methanol and mixtures thereof.

11. A process according to claim 10 wherein the nonsolvent is methanol.

12. A process according to claim 1 wherein said film-forming polymer is selected from the group consisting of cellulose acetate, polyelectrolytes and aromatic polyamides.

13. A process according to claim 1 wherein the film-forming polymer is dissolved in a solvent selected from the group consisting of acetone, cyclohexanone, formamide, dimethyl formamide, tetrahydrofuran, cyclohexane, dimethylsulfoxide and mixtures thereof.

14. A process according to claim 1 wherein said nonsolvent is selected from the group consisting of water, methanol, ethanol, propanol and mixtures thereof.

15. A process according to claim 2 wherein said filter cloth is polyolefin, said film-forming polymer is polyvinyl chloride and said nonsolvent is methanol.

16. A process according to claim 1 wherein said application is effected by selective evaporation of said nonsolvent from said surface portion of a backing material saturated with said nonsolvent.

17. A process according to claim 1 wherein said application is effected by impregnating the nonsolvent from the side of said backing material opposite that to which the polymer solution is applied.

18. A process according to claim 1 wherein said nonsolvent is miscible with water, and said gelling is effected by immersing the resultant backing material in a water bath.

19. A process according to claim 1 conducted as a continuous operation.

20. A selectively permeable, asymmetric composite membrane having mechanical strength, selective permeability and flux rate properties suitable for use in ultrafiltration or reverse osmosis, consisting essentially of a porous, flexible, textile fabric backing material prepared according to the process of claim 1.

* * * * *